US011693540B1

(12) United States Patent
Zou et al.

(10) Patent No.: US 11,693,540 B1
(45) Date of Patent: Jul. 4, 2023

(54) TECHNIQUE TO EMPHASIZE STORE BRANDING IN THE MULTI-STORE APP

(71) Applicant: Amazon Technologies, Inc., Seattle, WA (US)

(72) Inventors: Chaoqun Zou, Albany, CA (US); Gautam Chopra, Mountain View, CA (US); Chris Vitas, Atlanta, GA (US); Mansi Ashvin Desai, San Jose, CA (US); Sean Janis, Danville, CA (US); Edwin Vincent, Concord, CA (US); Tiangong You, Bay Point, CA (US); Ankit Devani, Fremont, CA (US); George Lu, Castro Valley, CA (US); Isaiah Simon, San Francisco, CA (US); Kavit Maral Mehta, San Jose, CA (US); Sean Dunning, Concord, CA (US); Jay Kirit Raval, Marina Del Rey, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/214,317

(22) Filed: Mar. 26, 2021

(51) Int. Cl.
*G06F 3/0484* (2022.01)
*G06Q 30/0601* (2023.01)

(52) U.S. Cl.
CPC ........ *G06F 3/0484* (2013.01); *G06Q 30/0641* (2013.01)

(58) Field of Classification Search
CPC .................... G06F 3/0484; G06Q 30/0641
See application file for complete search history.

(56) References Cited

U.S. PATENT DOCUMENTS 8,554,753 B1 * 10/2013 Bullock .............. G06F 16/2455
707/703
8,825,627 B1 * 9/2014 Indukuri ............... G06F 16/904
707/738

(Continued)

FOREIGN PATENT DOCUMENTS

WO WO-2021056940 A1 * 4/2021

OTHER PUBLICATIONS

Screenshots from "How to find a Amazon Seller's Store Name and Store Id," by Marketplace Blueprint https://www.youtube.com/watch?v=3rAsPDob4X8 (Year: 2017).*

(Continued)

*Primary Examiner* — Andrew T Chiusano
(74) *Attorney, Agent, or Firm* — Kilpatrick Townsend & Stockton LLP

(57) ABSTRACT

Techniques and methods are disclosed for providing improved and consistent navigation within a mobile shopping application. A default graphical user interface may be provided at a display of a user device. In response to a navigation request at the default graphical user interface, the application can enter a store mode for a separate specialty store within the application. While in the store mode, the application can present a subsequent graphical user interface that overlays the default graphical user interface. The subsequent graphical user interface can be configured using data conforming to a graphical interface specification. The graphical interface specification may also include rules for determining which navigation requests properly enter and leave the store mode.

20 Claims, 10 Drawing Sheets

(56) References Cited

U.S. PATENT DOCUMENTS

| | | | |
|---|---|---|---|
| 10,497,039 B1* | 12/2019 | Singh | G06F 16/248 |
| 11,100,554 B1* | 8/2021 | Gupta | G06Q 30/0641 |
| 2003/0167213 A1* | 9/2003 | Jammes | G06F 16/958 |
| | | | 705/26.62 |
| 2010/0223275 A1* | 9/2010 | Foulger | G06F 16/338 |
| | | | 707/E17.014 |
| 2014/0351085 A1* | 11/2014 | Kotas | G06F 8/38 |
| | | | 705/26.8 |
| 2017/0278174 A1* | 9/2017 | Harrell | G06Q 30/0643 |
| 2020/0150984 A1* | 5/2020 | Jones | G06F 16/954 |

OTHER PUBLICATIONS

"Amazon Stores Creative Asset Requirements," https://m.media-amazon.com/images/G/01/AmazonStores/Amazon_Stores_Creative_Asset_Requirements_US._V510761039_.pdf (Apr. 1, 2017). (Year: 2017).*

* cited by examiner

| GRAPHICAL INTERFACE SPECIFICATION 200 | |
|---|---|
| PARAMETER | DATA |
| INGRESS IDENTIFIERS 202 | INGRESS URL(S) 204; INGRESS RULE(S) 206 |
| EGRESS IDENTIFIERS 210 | EGRESS URL(S) 214; EGRESS RULE(S) 216 |
| SEARCH SCOPE 220 | STORE INVENTORY REFERENCE 222 |
| STORE FRONT PAGE IDENTIFIER 224 | STORE FRONT PAGE URL 226 |
| STORE CART IDENTIFIER 228 | STORE CART PAGE URL 230 |
| GRAPHICAL ASSETS 232 | ⌂ ~234   🛒 ~236   STORE LOGO 238<br>COLOR CONFIGURATION(S) 240   TOP NAVIGATION BAR 242   BOTTOM NAVIGATION BAR 244<br>NAVIGATION TEXT 246 |

TECHNIQUE TO EMPHASIZE STORE BRANDING IN THE MULTI-STORE APP

BACKGROUND

Application-based stores for mobile commerce and electronic retail can allow customers to search, select, and purchase items through conventional e-commerce techniques, including navigating to different web pages within the store application and adding items to a shopping cart. It may be beneficial to improve the store experience for a variety of reasons. Some conventional mobile commerce applications provide access to multiple stores without providing the ability for a user to distinguish between the stores, such that a user can navigate to a page within the application without realizing that they have entered a distinct part of the store. Additionally, a single user interface is typically provided across disparate storefronts within the same app, which is not ideal for providing a consistent user experience.

BRIEF DESCRIPTION OF THE DRAWINGS

Various embodiments in accordance with the present disclosure will be described with reference to the drawings, in which:

FIG. 2 is a simplified diagram depicting exemplary data included in a graphical interface specification, according to some embodiments;

DETAILED DESCRIPTION

Figure 1:
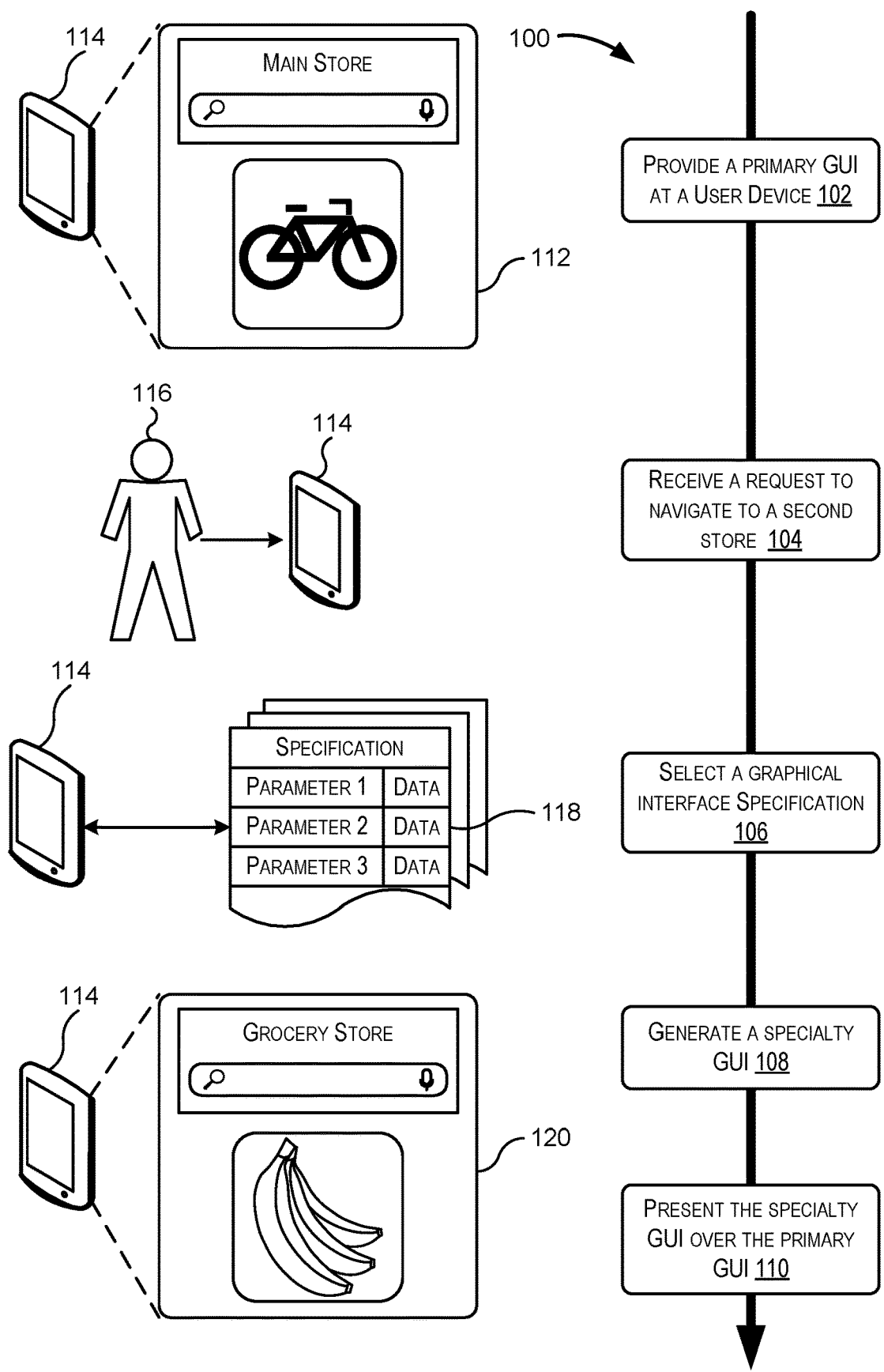
FIG. 1 is a simplified block diagram and associated flow chart of an example process to generate a specialty graphical user interface (GUI) utilizing a graphical interface specification, according to some embodiments.

Techniques described herein are directed to systems and methods for generating within a mobile application a graphical user interface that corresponds to a distinct brand or store. A mobile application may be referred to herein as "a mobile app," or "an app," for brevity. In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Although examples may be provided which include an application running on a user device, it should be appreciated that the same techniques may be applied in a variety of contexts such as web or browser applications, web pages, or the like. The word "exemplary" is used herein to mean "serving as an example, instance, or illustration." Any embodiment or design described herein as "exemplary" is not necessarily to be construed as preferred or advantageous over other embodiments or designs.

In at least one embodiment, a user device can present a primary GUI corresponding to a primary store (e.g., a default store) within a mobile shopping app. The user device can be any suitable computing device (e.g., smartphone, tablet, etc.) with a display for presenting a GUI. The primary store can be a retail store offering items within several categories or brands. An "item" is intended to refer to a product, a sellable unit, or anything else that may constitute the inventory of a store. Because different items may fall into one or more categories or brands, the primary store may be similarly divided into one or more specialty stores that can aggregate and sell the items associated with the brands. For example, the primary store may offer consumer goods (e.g., toys, books, tools, etc.) as well as food (e.g., groceries, produce, etc.), luxury items (e.g., jewelry, perfumes, designer clothing, etc.), and pharmaceuticals (e.g., prescription medicines, over-the-counter medicines, etc.). Each of these categories of items may be sold under one or more brands associated with the retail store, with each brand corresponding to a separate specialty store. As a user navigates within the app to search and select items from one of the specialty stores, the user device can generate and present a specialty GUI corresponding to that specialty store. The specialty GUI can be overlain on the primary GUI so that the user is aware that they have entered a distinct portion of the retail store while not exiting the app. Upon entering the specialty store, the original GUI can transition to a background state not visible to the user. The transition to the specialty GUI may be more conspicuous than merely serving a new webpage or other web content with the original GUI.

Previously, user interfaces within a specialty store failed to provide a consistent user experience. To provide this consistency, GUIs within a specialty store (referred to herein as "specialty GUI(s)") can be generated from an interface specification specific to the specialty store. The interface specification for each specialty store can include data that can be used to configure and customize the GUI of each store, while ensuring each GUI conforms to common layout and/or formatting schemes. For example, the interface specification can include icons, color schemes, text, and other graphical features that are used to generate the graphical elements of the specialty GUI. The interface specification may be based on a common template that applies to all of the interface specifications. In this way, for example, the specialty GUI for a specialty food store can be visually distinct from a GUI corresponding to a specialty luxury goods store, while retaining a similar layout of graphical features (e.g., icons, logos, etc.), navigational fields (e.g., search bars, back buttons, etc.), or store content (e.g., search results, item descriptions, etc.). The specialty GUI can also be visually distinct from the primary GUI and have similar consistent layout of elements, so that the user experience with both the original GUI and the specialty GUI is intuitively similar.

In some embodiments, the interface specification can include navigational rules that define the behavior of links and navigational buttons (e.g., a back button or home button) accessed from the specialty GUI. The navigational rules can include identifiers (e.g., uniform resource identifiers (URIs), uniform resource locators (URLs), etc.) for webpages associated with the specialty store. For example, the navigational rules can include a URL for the specialty store home page, such that if the home button of the specialty GUI is pressed, a webpage presented with the specialty GUI returns to a home page designated as the specialty store home page. Similarly, searches within the specialty store may present one or more links to a description page for an item in the search. Interacting with these links will bring the user to the respective description page while retaining aspects of the specialty GUI around the web content.

Additionally, the navigational rules can define identifiers for entering and leaving the specialty store. For example, if the user is navigating the retail store from the primary GUI and selects a link to the item description page for an item associated with the specialty food store, the specialty GUI for the food store can be generated and presented over the original GUI, with the linked description page shown as web content within the specialty GUI. Upon selecting the link, the primary GUI may be transitioned from a foreground state in which the primary GUI is visible to the user to a background state in which the primary GUI is hidden from the user. Similarly, the user can interact with a link presented within the specialty GUI to exit the specialty store. For example, an option within the specialty store shopping cart page may be a link to the shopping cart page of the larger retail store. Upon interacting with this link, the specialty GUI can be dismissed and the primary GUI transitioned from the background state to a foreground state such that the retail store shopping cart page is displayed for the user within the primary GUI.

In some embodiments, the interface specification can also include a search scope that governs search queries submitted within the specialty store utilizing the specialty GUI. For example, the specialty GUI may correspond to a specialty grocery store within the larger retail store, so that searches conducted from the specialty GUI will return results corresponding to groceries or other items associated with the grocery store and not corresponding to unrelated items from other portions of the retail store. If a search query does not return any results for items within the specialty store, the user can be presented with an option to conduct a broader search against the item inventory of the larger retail store. Selecting this option can bring the user out of the specialty store, such that the primary GUI transitions from the background state and becomes visible to the user. According to certain embodiments, the specialty GUI can transition to a background state. The primary GUI can then present the user with a navigational option to return to the specialty GUI at the state the specialty GUI was in upon leaving the specialty store.

The techniques and methods described herein provide several advantages over conventional user interfaces for mobile shopping. In particular, providing distinct yet similar GUIs for separate stores within the same application improves the user experience with the application. Conventional techniques would provide separate entire applications for each store or brand, such that each application would have a wholly distinct user interface. Transitioning between the separate applications would be jarring to a user and would prevent the user from seamlessly transitioning from one set of items to another during a single shopping experience. Conversely, attempting to agglomerate all available items in a single application with a single user interface can result in the user inadvertently navigating to a separate store within the application without realizing that the items therein are sold from a distinct store. Having a consistent user experience across multiple specialty stores within a single application provides for an easier, more intuitive, and more efficient navigation of the stores.

In addition, the techniques described herein provide one or more technical improvements to a user device and/or server device implementing aspects of the techniques. For example, presenting different GUIs within the same application frees up significant resources on the user device, since only one application is running in memory and separate store applications are not backgrounded within the device memory to support transitioning between them as the user decides to shop for different items. Similarly, a server device providing store web content to the store application need only interface with that one application instead of several. The graphical interface specifications for the specialty GUIs are built according to a common template, which can allow for efficient storage of the included data. For example, the same graphical asset for representing the shopping cart navigational option in the specialty GUI can be included in more than one graphical interface specification, such that the graphical asset is only stored in one location. Moreover, having a common template for the graphical interface specifications can allow for efficient caching of the data at the user device to aid in transitioning between a specialty GUI and the primary GUI.

Turning now to the figures, FIG. 1 is a simplified block diagram and associated flow chart of an example process 100 to generate a specialty GUI utilizing a graphical interface specification, according to some embodiments. As shown in FIG. 1, process 100 may begin at block 102, where a primary GUI 112 can be provided at a user device 114. The user device 114 can be any suitable user device for displaying the primary GUI 112, including a smartphone, a tablet computer, a laptop computer, or other computing device. By way of example, FIG. 1 depicts the user device 114 as a smartphone. The user device 114 can include a display for presenting graphics and other visualizations, including the primary GUI 112. The display can be a touchscreen display, a built-in display, a separate display device, or other similar visual output component.

The primary GUI 112 can correspond to a primary storefront of an online retailer or other store conducting mobile shopping through an application at the user device 114. The primary GUI 112 can include a variety of graphical assets and other features. For example, the primary GUI 112 can have a search field for inputting item search queries, a navigation bar containing links to web pages or other content of the primary storefront, text or logos identifying the content presented, icons to depict the functionality of various components of the GUI, and an area for displaying the web pages or web content at the display of the user device 114. As depicted in FIG. 1, the primary GUI 112 can contain text (e.g., a store identifier) identifying the store (e.g., "Main Store"), a search bar (e.g., a field for inputting text strings, identified by a magnifying glass icon), and an item (e.g., a bicycle). Specific features of GUIs embodied in this disclosure will be discussed in more detail below with respect to FIGS. 4-7.

In some embodiments, the primary storefront can represent a global store from which all items offered by the online retailer can be searched and accessed. In this way, the primary GUI 112 can serve as an initial access point for user interactions within the store and can provide a default interface for the user 116 to shop within the primary storefront. Some categories of items may be associated with one or more specialty stores associated with the online retailer. The one or more specialty stores may utilize separate shopping cart pages and checkout pages to purchase the items associated with the one or more specialty stores. For example, grocery items may be stocked separately within the retailer's supply chain such that the sourcing and delivery of these items can involve separate mechanisms from the delivery of other goods purchasable through the primary storefront. Because the specialty stores may have separate features associated with the purchase of items from the specialty stores, links to items and other content associated with the specialty stores can provide direct navigation to the specialty stores.

At block 104, a request to navigate to a second store (e.g., a specialty store) within the application can be received. The request can result from an interaction from the user 116 with the user device 114. For example, the user 116 may search for a particular item from the primary GUI 112, for instance, "bananas." The results of the search can be displayed to the user 116 within primary GUI 112. The results can include links to one or more items corresponding to bananas in the primary storefront. The bananas can be an item associated with a specialty grocery store. Upon interacting with one of the links to an item in the specialty grocery store, the request to navigate to the second store is received at the user device 114.

At block 106, a graphical interface specification 118 can be selected from a plurality of graphical interface specifications. In some embodiments, the graphical interface specification 118 can correspond to a store mode in which the application is configured to display content corresponding to a specialty store. The store mode can represent a distinct state of the application and can have a GUI different from the GUI provided initially at the user device 114. As will be discussed in more detail below with respect to FIG. 2, the graphical interface specification 118 can include a variety of parameters or configuration data that represent attributes for the configuration of at least one graphical interface element utilized with a specialty GUI 120 for the store mode. For example, graphical interface specification 118 can include icons and a color scheme for generating the specialty GUI 120.

The graphical interface specification 118 can also include one or more ingress identifiers and one or more egress identifiers. These identifiers can be URIs, URLs, or other data identifiers for obtaining web content from a web server or other server device. When a link or other navigational interaction contains data that matches an ingress identifier included in one of the plurality of graphical interface specifications, the graphical interface specification containing the matching ingress identifier is selected as the graphical interface specification 118. Similarly, when in the store mode corresponding to the specialty store, if a link is selected that contains data matching one of the egress identifiers contained in the graphical interface specification 118, the application can exit the store mode and return to the primary storefront. To provide consistent navigation, the ingress identifiers for each graphical interface specification can be mutually exclusive.

In some embodiments, all or a portion of the configuration data of the graphical interface specification 118 can be stored at a data store at a remote device (e.g., a server device, or a storage location accessible to the server device). When the store application is started, the configuration data of the graphical interface specification 118 can be retrieved by the remote device. In some embodiments, the configuration data can be cached at the user device 114. When an ingress request is received, the application can retrieve the cached configuration data to configure the specialty GUI 120. When cached at the user device 114, the configuration data can be synchronized with the data store when the application is started.

At block 108, the specialty GUI 120 can be generated. Generating the specialty GUI 120 can include obtaining configuration data from the graphical interface specification 118. The configuration data can be used to instruct a user interface module or other software module of the application to generate (e.g., compose) one or more graphical elements of the specialty GUI 120. Generating the graphical elements can include positioning the elements within the field of the display, applying a color scheme included in the configuration data, and other similar operations for creating a graphical interface.

At block 110, the specialty GUI 120 can be presented at the display of the user device 114. Similarly to primary GUI 112, the specialty GUI 120 can include a variety of graphical assets and other features. For example, the specialty GUI 120 can have a search field for inputting item search queries, a navigation bar containing links to web pages or other content of the specialty store, text or logos identifying the specialty store or other content, icons to depict the functionality of various components of the GUI, and an area for displaying the web pages or web content at the display of the user device 114. As depicted in FIG. 1, the specialty GUI 120 can contain text identifying the specialty store (e.g., "Grocery Store"), a search bar for searching the specialty store (e.g., a field for inputting text strings, identified by a magnifying glass icon), and an item (e.g., bananas).

FIG. 2 is a simplified diagram depicting exemplary data included in a graphical interface specification 200, according to some embodiments. The graphical interface specification 200 may be an example of the graphical interface specification 118 of FIG. 1. In some embodiments, the graphical interface specification 200 can include key/value pairs corresponding to each of the parameter fields depicted in FIG. 2. Some of the key/value pairs from graphical interface specification 200 can be incorporated in implementation code for the application (e.g., a static dictionary). For example, ingress identifiers 202 and egress identifiers 210 can be included as values in the configuration, so that some or all of the ingress URL(s) 204 and egress URL(s) 214 are included in the app. In some embodiments, data corresponding to one or more of the values in the configuration data may be located at a remote data store and cached or synchronized with the user device. For example, graphical assets referenced by values in the configuration data can be obtained from a remote data store. In these embodiments, the graphical interface specification 200 can be a JSON file or other suitable file for exchange of data objects between the remote data store and the user device.

The graphical interface specification 200 can include the ingress identifiers 202, egress identifiers 210, a search scope 220, a store front page identifier 224, a store cart identifier 228, and graphical assets 232. Each of these parameters can include one or more values or data that specifies the parameters' content. The data can be provided as part of the graphical interface specification 200 or by reference to a separate data store or other location containing the data (e.g., graphical assets).

The ingress identifiers 202 can be URIs or URLs identifying the locations of data or content associated with web pages associated with a specialty store mode. The ingress identifiers can include one or more ingress URL(s) 204 corresponding to content for the specialty store. When a user navigates to a page identified by one of the ingress URL(s) 204, the configuration data can be obtained from the graphical interface specification 200 that contains the ingress URL(s) 204 matching the page to which the user navigated.

In some embodiments, the ingress identifiers 202 can include ingress rule(s) 206. The ingress rule(s) 206 can define identifiers dynamically, for instance, by specifying a rule to check for a particular string as part of the URL path or other URL parameter. For example, an ingress rule can check that a URL contains a path or part of a path corresponding to the specialty store. By dynamically identifying URLs, web pages can be associated with the specialty store without modifying the set of ingress URL(s) 204 within the configuration files or the graphical interface specification 200.

Similarly, the egress identifiers 210 can be URIs or URLs identifying the locations of web pages that, when navigated to from within a secondary GUI corresponding to the specialty store mode, cause the application to exit the specialty store mode and return to a primary GUI corresponding to a primary store. In some embodiments, the egress identifiers 210 can include egress URL(s) 214 that point to particular pages associated with the primary store (e.g., a shopping cart page of the primary store). Additionally, the egress identifiers 210 can include egress rule(s) 216 that can define identifiers dynamically. Similarly to the ingress rule(s) 206, the egress rule(s) 216 can specify a rule to check for a particular string as part of the URL path or other URL parameter, in order to allow for changes to the associated pages without modifying egress URL(s) 214.

In some embodiments, the search scope 220 can include a store inventory reference 222 that identifies data corresponding to the categories of items available to search against from within the specialty store mode. The store inventory reference 222 can be an alias to a collection of identifiers pointing to the items and item information within a database. In this way, the scope of searches within the specialty store can be limited to items sold within that store. Thus, search results from within the specialty store may only return specialty store items (e.g., grocery items searched from within a specialty "Grocery Store").

The store front page identifier 224 can identify a front page, home page, landing page, or other default page that can be the first page presented at the specialty GUI when entering the specialty store mode. The store home page identifier can include a store front page URL 226 corresponding to the front page's location. In some embodiments, the store front page identifier 224 can be the same as one of the ingress identifiers 202, as is the case when a user navigates to the specialty store home page from the primary store. The store front page URL 226 can be used within the specialty store mode to direct navigation requests from interactions with a "home" button within the specialty GUI corresponding to the specialty store mode.

The store cart identifier 228 can, in some embodiments, include a store cart page URL 230. The store cart page URL 230 identifies the web page corresponding to the shopping cart for the specialty store. The store cart identifier 228 can also include an identifier for the store cart data, such that the store cart can be accessed and updated from within the specialty store (e.g., add an item to the cart from a link within the specialty GUI).

The graphical assets 232 can be one or more graphical interface elements used within the specialty GUI corresponding to the specialty store mode. The graphical assets 232 can include any suitable number of icons (e.g., pre-defined icons configured for the specialty store), including the commonly used icons of a home icon 234 and cart icon 236. The home icon 234 and the cart icon 236 can correspond to navigational elements for navigating to a home page (e.g., the store front page identified by the store front page URL 226) or a cart page (e.g., the store cart page identified by the store cart page URL 230). The graphical assets 232 can also include a store logo 238, one or more color configurations 240, a top navigation bar 242, a bottom navigation bar 244, and navigation text 246. The top navigation bar 242 can be a graphical element (e.g., a container) positioned at the top (or at any suitable location within the specialty GUI) of the specialty GUI that provides a bar or similar field for navigational inputs within the specialty GUI. For example, the top navigation bar 242 can include a search bar and one or more links to pages within the specialty store. The links presented with the top navigation bar 242 can include the navigation text 246. The top navigation bar 242 can also include the store logo 238.

Similarly, the bottom navigation bar 244 can be a graphical element at the bottom (or at any suitable location within the specialty GUI) of the specialty GUI that provides a bar or similar field for additional navigational inputs within the specialty GUI. The bottom navigation bar 244 can include the home icon 234 and the cart icon 236, as well as icons for settings and a user account, according to certain embodiments. The bottom navigation bar 244 can be configured to have a different appearance than the top navigation bar 242 and a bottom navigation field of the primary GUI, to further distinguish the respective functionalities. For example, the bottom navigation bar 244 can span a width less than the total width of a display of the user device, so that the bar appears to float over the content displayed underneath.

The color configuration(s) 240 can include color specifications (e.g., hexadecimal web colors) for one or more of the graphical interface elements within the specialty GUI, including colors for the icons and navigation bars described above. In some embodiments, one or more of the color configuration(s) 240 can be implemented in the native code of the app, so that the resulting color scheme for the specialty GUI is available without retrieving additional color specifications from the graphical interface specification 200.

Figure 3:
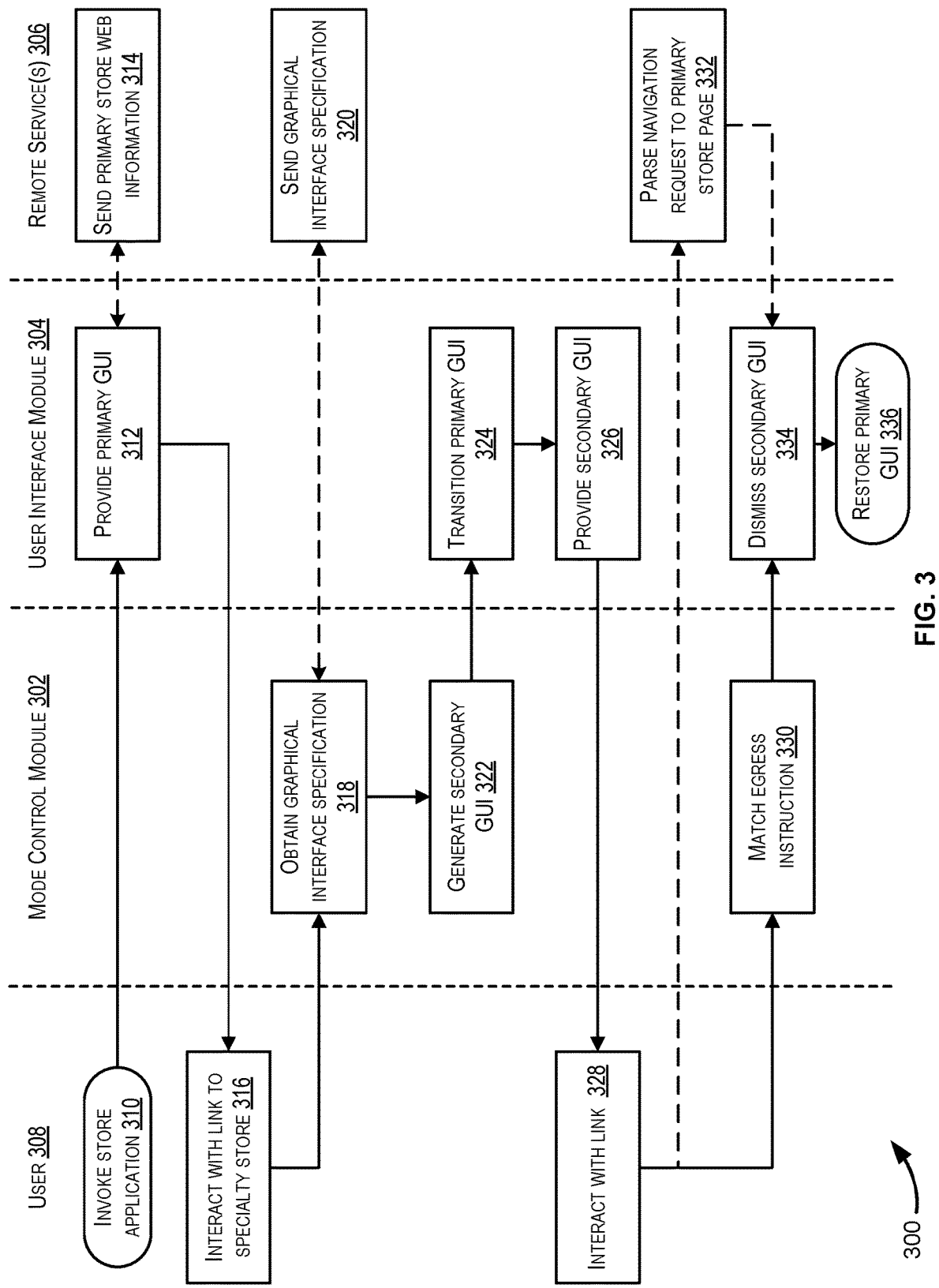
FIG. 3 is a flowchart illustrating an exemplary process for providing primary and secondary GUIs, according to some embodiments.

FIG. 3 is a flowchart illustrating an exemplary process 300 for providing a primary and secondary GUI, according to some embodiments. The process may be performed at a user device running an application configured to generate the GUIs as described herein. The application can be an application (e.g., a mobile shopping application) that provides GUIs corresponding to one or more storefronts within an online store. The user device may be similar to one or more user devices described in this disclosure, for example, the user device 114 described with respect to FIG. 1. In some embodiments, the application can include a mode control module 302 and a user interface module 304. The mode control module 302 can be a software module configured to process and handle various requests and interactions within the application to invoke different store modes. For example, the mode control module 302 can configure a GUI in accordance with a graphical interface specification like the graphical interface specification 200 described in FIG. 2. The user interface module 304 can be a software module configured to present the graphical elements of a GUI at a display of the user device. Said another way, the user interface module 304 can manage the visual output of a GUI generated and configured by the mode control module 302.

The app, including mode control module 302 and user interface module 304, may interact with one or more remote service(s) 306. The interaction can include sending and receiving data corresponding to the operation of the app. For example, the application can present web pages and other web content within a field of the GUI, the web pages served from a web server or other remote device. As described in more detail with respect to FIG. 8 below, the remote service(s) 306 (e.g., the remote service(s) 834 of FIG. 8) can include a navigation service, a configuration service, and a search scoping service. Some of the operations described herein for the remote service(s) 306 may be performed locally at the user device or at a combination of one or more remote devices and the user device.

The process can begin at entry point 310 with the user 308 interacting with the user device to invoke the application. The invocation can include an interaction that directly opens the application at the user device (e.g., pressing an application icon to open the app). In some embodiments, the user 308 can interact with a link or other object in another application running at the user device that invokes the app. For example, the user 308 can interact (e.g., click, tap, press, etc.) a link within a web browser app. The link can be a URL or other identifier to a page associated with a storefront within the app. Instead of navigating to the corresponding page within the web browser app, the user device can interpret the navigation request to invoke the store application to present the requested web page from within the app.

Once the application has been started, the user interface module 304 can provide a primary GUI, at block 312. The primary GUI can correspond to a primary storefront within the app. The primary GUI may be similar to other primary GUIs or default GUIs described herein, including the primary GUI 112 of FIG. 1. The primary GUI can include a field or other space for presenting web content, web pages, or the like. The primary GUI can also include graphical elements to present navigational or other information to the user 308 at the display. Web content can be served to the store application by a web service or other remote service(s) 306. For example, at block 314, web content for the primary store (e.g. a page of suggested items for sale within the primary storefront) can be sent to the store application at the user device.

At block 316, the user 308 can interact with a link to a specialty store. For example, while browsing items in the primary storefront via the primary GUI, the user 308 may tap on a link to an item that is sold in a specialty store (e.g., bananas sold from a specialty grocery store). The link can be a URL corresponding to an ingress identifier for the specialty store mode, such that tapping on the link is a navigation request to a page or other content within the specialty store. The ingress identifier may be similar to one or more of the ingress identifiers 202 included in the graphical interface specification 200 of FIG. 2. Because the navigation request includes information that matches the ingress identifier, the mode control module 302 can determine that the application should enter a specialty store mode corresponding to the specialty store indicated by the navigation request. In some embodiments, a remote routing service can be configured, based on the ingress identifiers included in the graphical interface specification, to identify navigation requests from the store application or other apps (e.g., a web browser app) that match the ingress identifiers and indicate to the mode control module 302 that the application should enter the specialty store mode.

At block 318, the mode control module 302 can obtain the graphical interface specification that corresponds to the navigation request by matching the ingress identifiers included in the graphical interface specification to the URL or other portion of the navigation request. Obtaining the graphical interface specification can include retrieving a cached or synchronized copy of a configuration file or configuration data for the graphical interface. The cached configuration file can be one of a plurality of configuration files that are synchronized or cached at the user device when the store application first starts. In some embodiments, a graphical interface specification or configuration file or other configuration data may be obtained from one of the remote service(s) 306 (e.g., a configuration service 838 described below with respect to FIG. 8). Obtaining the graphical interface specification from a remote device can typically occur when the store application first starts, but can also occur when the mode control module 302 receives the navigation request, according to certain embodiments. In some embodiments, whether the graphical interface specification or other configuration data is obtained from the cache or from the remote service can be based at least in part upon a latency of receiving remote data from the remote service. For example, if obtaining the configuration data from the remote service would exceed a threshold time, the configuration data may be obtained from the cache.

Once the graphical interface specification or other configuration data is obtained, the mode control module 302 can generate a secondary GUI based on the configuration data, at block 322. The secondary GUI can correspond to the specialty store within a larger retail store represented by the primary storefront. The secondary GUI may be similar to other specialty GUIs, secondary GUIs, or subsequent GUIs described herein, for example, the specialty GUI 120 described with respect to FIG. 1. Because it is representing a specialty store within the store app, the secondary GUI can be visually distinct from the primary GUI while retaining a consistent layout of some graphical interface elements. For example, both the primary GUI and the secondary GUI can include a field or container for presenting web pages or web content at the display of the user device, while each has a container (e.g., a top navigation bar) providing a search interface and other navigational links located at the top of the display. The secondary GUI can be distinguished with a color scheme for graphical interface elements that differs from the colors applied within the primary GUI. Similarly, common icons like home icons and cart icons may have a similar form when used in both the primary GUI and the secondary GUI, but the icons for the secondary GUI can have a different color than their counterparts within the primary GUI.

Once the secondary GUI is configured and generated by the mode control module 302, the user interface module 304 can transition the primary GUI to a background state, at block 324, and provide the secondary GUI over the top of the primary GUI, at block 326. One or more of the operations within blocks 324 and 326 can occur simultaneously or nearly simultaneously. Transitioning the primary GUI to the background state and providing the secondary GUI on top of the primary GUI can take various forms visually, including animations for "sliding" the secondary GUI over the primary GUI, fading the secondary GUI in from a transparent or otherwise invisible state, or other visualizations. The purpose of the visual transition can be to indicate to the user 308 that the store application has entered a store mode corresponding to the specialty store to which the user 308 navigated. When the primary GUI transitions to the background state, it may not be visible to the user 308 at the display of the user device, such that the secondary GUI is visible and the user 308 can only interact with the secondary GUI. Transitioning the primary GUI to a background state may include operations to store primary state data associated with the primary GUI. The primary state data can include the navigational history of the current instance of primary GUI (e.g., a navigational stack of pages visited), the currently displayed web page or web content, search history from within the primary GUI, and cart information for the primary storefront's cart (e.g., the number of items in the cart).

At block 328, the user 308 can interact with another link or navigational element (e.g., a navigation button like a back button or close button) within the secondary GUI. For example, the user 308 can tap on a link to go to the cart page of the primary storefront. The link can include a URL corresponding to an egress identifier contained in the graphical interface specification for the specialty store mode. Similarly to matching navigational request URLs with ingress identifiers, the mode control module 302 (or a remote routing service, in some embodiments) can match a part of the link selected by user 308 to an egress identifier, at block 330. The egress identifiers may be similar to the egress identifiers 210 described above with respect to FIG. 2. If the link corresponds to one of the egress identifiers, the mode control module 302 can take the store application out of the specialty store mode.

In some embodiments, the user 308 can interact with a link from a web browser application while the store application has been placed in a background state at the user device. When in the background state, the store application may retain its state such that the secondary GUI would be presented at the display if the store application were to come out of the background state (e.g., if the user 308 switches between apps running on the user device). In this instance, interacting with the link may cause the navigation request to be parsed by one or more of the remote service(s) 306, at block 332. The remote service(s) 306 can be a navigation service or a routing service that identifies that the navigation request from within the web browser application corresponds to a page or web content to be displayed from within the store app, and in particular, associated with the primary storefront. The remote service(s) 306 can then indicate to the mode control module 302 to exit the specialty store mode and return to the primary storefront.

In still other embodiments, interacting with the link can be a navigational request to a page associated with another specialty store. In these cases, the link can match ingress identifiers for the other specialty store while not matching egress identifiers for the current specialty store mode. Said another way, the graphical interface specifications for different specialty store modes need not specify all possible egress identifiers to navigate out of the specialty store mode; a subsequent navigation request to a different specialty store can impliedly indicate to the mode control module 302 to exit the current specialty store mode and enter the different specialty store mode. In this way, consistent and exclusive ingress identifiers and ingress rules for the different specialty stores accessible from within the store application can provide correct and consistent navigation from within a single app.

At block 334, the user interface module 304 can dismiss the secondary GUI. At endpoint 336, the user interface module can restore the primary GUI. One or more of the operations involved in blocks 334 and 336 can occur substantially simultaneously. Dismissing the secondary GUI can include a variety of visualizations, including animations similar to the animations for transitioning the primary GUI to the background state and displaying the secondary GUI on top.

When the secondary GUI is dismissed, secondary state data corresponding to the state of the secondary GUI can be stored. The secondary state data can include navigational history of the current instance of secondary GUI (e.g., a navigational stack of pages visited within the specialty store mode), the currently displayed web page or web content, search history from within the secondary GUI, and cart information for the secondary store mode's cart (e.g., the number of items in the cart). In some embodiments, the secondary state data and the primary state data may be stored in the same data object or other common record (e.g., database object, data structure, etc.) with the primary state data identifiable as primary state data and the secondary state data identifiable as secondary state data (e.g., with a label, tag, or other data identifier within the common record). For example, the search history initiated from within the primary GUI may be stored in a common record with the search history initiated from within the secondary GUI, to create a common search history for the store application. A portion of the common search history corresponding to the primary storefront can be identified with a label indicating the correspondence with the primary storefront. Similarly, a portion of the common search history corresponding to the specialty store mode can be identified with a different label indicating the correspondence with the specialty store mode.

In some embodiments, dismissing the secondary GUI can include transitioning the secondary GUI to a background state not visible at the display of the user device. If the navigation request was to a page in another specialty store, the store application can return to block 318 to carry out similar operations as described to generate a subsequent GUI for the second specialty store mode.

Figure 4:
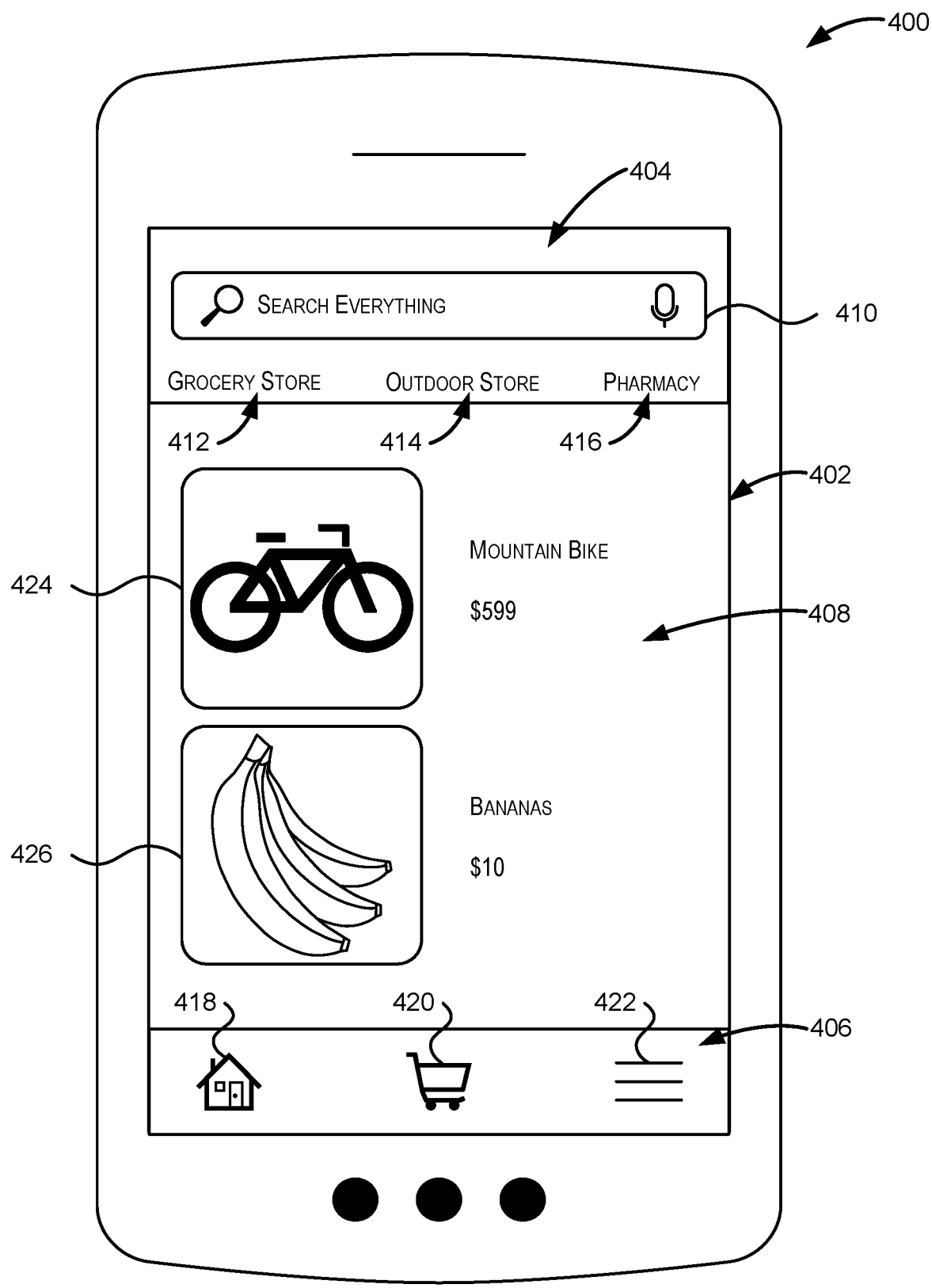
FIG. 4 is a diagram illustrating an example GUI corresponding to a default and/or primary store, according to some embodiments.

FIG. 4 is a diagram illustrating an example GUI (e.g., GUI 402) corresponding to a default store, according to some embodiments. As described herein, user device 400 that displays GUI 402 can be similar to other user devices, for example, user device 114 of FIG. 1, while GUI 402 can correspond to the primary GUI 112 of FIG. 1 or other primary GUIs corresponding to a primary storefront or default store.

The GUI 402 can include numerous graphical interface elements like containers for a top navigation bar 404, a bottom navigation bar 406, and web content field 408. Within the top navigation bar 404 can be a search bar 410 and navigational links 412-416. The navigational links can, in some embodiments, correspond to links to home pages of one or more specialty stores. As depicted here, grocery store link 412 can correspond to a specialty grocery store, outdoor store link 414 can correspond to a specialty outdoor store, and pharmacy link 416 can correspond to a specialty pharmacy. These navigational links 412-416 can contain URLs that are included in the graphical interface specifications for the respective specialty stores, such that tapping on the links can cause the store application to switch to the corresponding specialty store mode. The navigational links 412-416 depicted in FIG. 4 are shown by way of example and are not to be construed as limiting on embodiments of the present disclosure. Other links to other specialty stores are contemplated, as are navigational links to other locations within the primary storefront that do not constitute an ingress into a specialty store mode. For example, the top navigation bar 404 can also include navigation buttons like a back button to navigate backwards within a sequence of pages visited within the primary store.

The bottom navigation bar 406 can include further navigational links. As depicted, the bottom navigation bar 406 includes icons representing buttons within the GUI 402, including a home icon 418, a cart icon 420, and a settings icon 422. These icons can be common within the primary store GUI and subsequent GUIs for the specialty stores. For example, the button represented by the home icon 418 can include a link to the home page of the primary store, while the button represented by the cart icon 420 can include a link to the primary store cart page.

The web content field 408 can display web pages and other web content corresponding to locations within the primary store. For example, a user can search for items within the primary store using the search bar 410, and the search results can be displayed in the web content field 408. The web pages can include graphics and other information for items available within the primary store. As a non-limiting example, the web content can include a mountain bike 424 and bananas 426, as well as textual information about the items (e.g., name and price). Some or all of the text and graphical elements displayed for the items in the web content field can be a link to a different web page, including pages with detailed item descriptions. Other links can include links or buttons to add the item to a store shopping cart. In some embodiments, the primary store can display all items available for purchase from within the store app, including items that would be categorized under a specialty store. For example, the bananas 426 may be purchasable from within the specialty grocery store linked to by grocery store link 412. If a user taps on the bananas 426 graphical element or a related link in the identifying text, that interaction can constitute a navigation request that includes an ingress identifier for the specialty grocery store.

Figure 5:
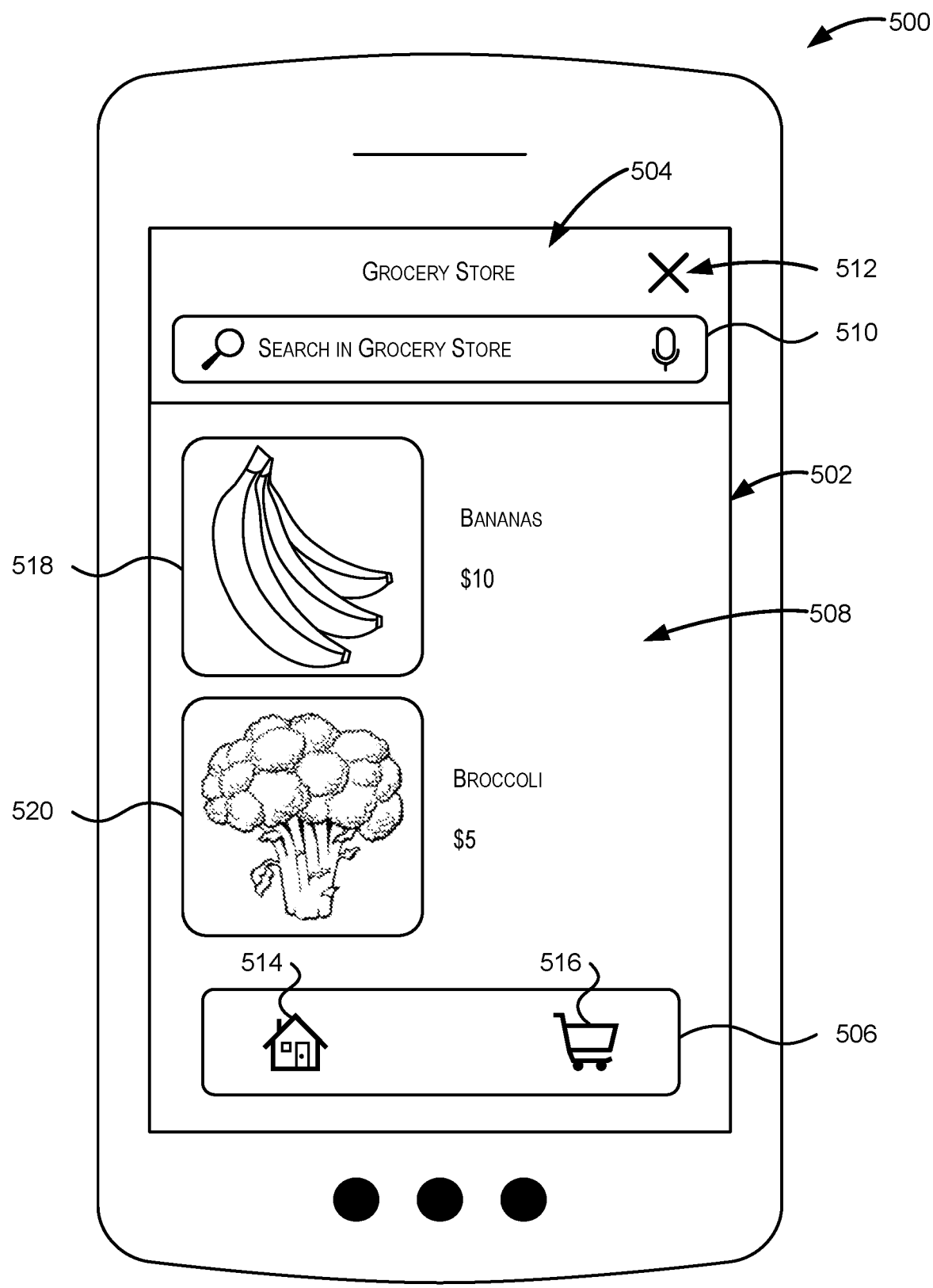
FIG. 5 is a diagram illustrating an example GUI corresponding to a specialty store, according to some embodiments.

FIG. 5 is a diagram illustrating an example GUI (e.g., GUI 502) corresponding to a specialty store, according to some embodiments. As described herein, the user device 500 that displays GUI 502 can be similar to other user devices, including user device 400 of FIG. 4, while the subsequent GUI 502 may be similar to other specialty GUIs (also referred to as "secondary GUIs" or "subsequent GUIs" corresponding to a specialty store mode), including the specialty GUI 120 of FIG. 1. As depicted in FIG. 5 as a non-limiting example, the specialty store mode can correspond to a grocery store, for instance the grocery store discussed above with respect to FIG. 4. In some embodiments, the subsequent GUI 502 in FIG. 5 may be provided in response to a user interacting with the grocery store link 412 of FIG. 4.

The subsequent GUI 502 can include graphical elements that are configured based on configuration data from a graphical interface specification (e.g., the graphical interface specification 200 of FIG. 2). The graphical elements can include containers for a top navigation bar 504, a bottom navigation bar 506, and a web content field 508. The top navigation bar 504 and bottom navigation bar 506 are different from the top navigation bar 404 and bottom navigation bar 406 of the primary GUI in at least that the top navigation bar 504 and bottom navigation bar 506 are configured based on the graphical interface specification. For example, the top navigation bar 504 and bottom navigation bar 506 can have different background colors or other color schemes distinct from colors applied to top navigation bar 404 and bottom navigation bar 406.

The top navigation bar 504 can include a search bar 510 and a close button 512. The search bar 510 can, in some embodiments, include indicator text that shows that search queries executed through the search bar 510 will be scoped to the items available within the grocery store (e.g., based at least in part on searching a data store of items associated with the grocery store and/or identified in an interface specification corresponding to the grocery store). For example, a search for "oranges" may return a web page featuring items that match the search term "oranges," while a search for "mountain bikes" may return no results since mountain bikes may not be sold within a specialty grocery store. The close button 512 can be a button or link that allows the user to leave the specialty store mode and return to the primary storefront. Interacting with the close button 512 can provide a navigation instruction that indicates to a mode control module (e.g., the mode control module 302 of FIG. 3) to exit the specialty store mode, dismiss the subsequent GUI 502, and provide the GUI corresponding to the primary storefront. In some embodiments, the close button 512 does not include an identifier that would match an egress identifier included in the graphical interface specification for the specialty store mode. In these cases, the functionality of the close button 512 can be included in the native code for the store app.

The bottom navigation bar 506 can include graphical navigation elements like home icon 514 and cart icon 516. The home icon 514 can represent a button with a link to the specialty store home page. Similarly, the cart icon 516 can represent a button with a link to the specialty store cart page. The identifiers for the specialty store home page and specialty store cart page are included in the graphical interface specification for the specialty store, and may be similar to the store front page URL 226 and store cart page URL 230 of FIG. 2.

Although not depicted in FIG. 5, the subsequent GUI 502 can include navigational text similar to the navigational links 412-416 of FIG. 4. In some embodiments, the navigational text can be text that identifies particular icons or buttons within the subsequent GUI 502. For example, home icon 514 may have accompanying navigational text identifying that the button navigates to the "home" page. As another example, the top navigation bar 504 can include textual links to particular pages within the specialty store. The navigational text can be defined and configured by the graphical interface specification for the specialty store, and may be similar to the navigational text 246 of FIG. 2.

Similarly to the web content field 408 of FIG. 4, the web content field 508 can display web pages and other web content corresponding to locations within the specialty store. For example, a user can search for items within the specialty store using the search bar 510, and the search results can be displayed in the web content field 508. The web pages can include graphics and other information for items available within the primary store. As a non-limiting example, the web content can include bananas 518 and broccoli 520, as well as textual information about the items (e.g., name and price). Some or all of the text and graphical elements displayed for the items in the web content field can be a link to a different web page, including pages with detailed item descriptions. Other links can include links or buttons to add the item to a specialty store shopping cart. Typically, in several embodiments, links for items displayed within the specialty store may not match an egress identifier for the specialty store mode. Said another way, most links within the specialty store may link to other pages within the specialty store to reduce the possibility that the user inadvertently leaves the specialty store. Specific links for egressing the specialty store can include, for example, a link to the primary store cart page found within the specialty store cart page.

In some embodiments, items available within the specialty store may have similar or identical counterparts available within a similar but distinct specialty store. The search scope from within the specialty store may be expansive enough to include a limited number of these related items to improve the user's shopping experience. For example, the grocery store depicted by way of example in FIG. 5 may include groceries available for delivery to a user's home, while a related specialty store may sell groceries available for in-store pick-up by the user or that are delivered by a separate delivery service than the example grocery store. In this case, if the user searches for "bananas" within the subsequent GUI 502, some results presented may include both bananas 518 available within the specialty grocery store and other bananas (not depicted) available within the other specialty store. Selecting the other bananas may include a navigation request to enter the other specialty store mode, which can result in leaving the specialty grocery store mode, dismissing the subsequent GUI 502, and being provided a further GUI corresponding to the other specialty store. In this way, the user can navigate to a second specialty store within the store application without having to first return to the primary store by interacting with an egress link or closing the subsequent GUI 502.

Figure 6:
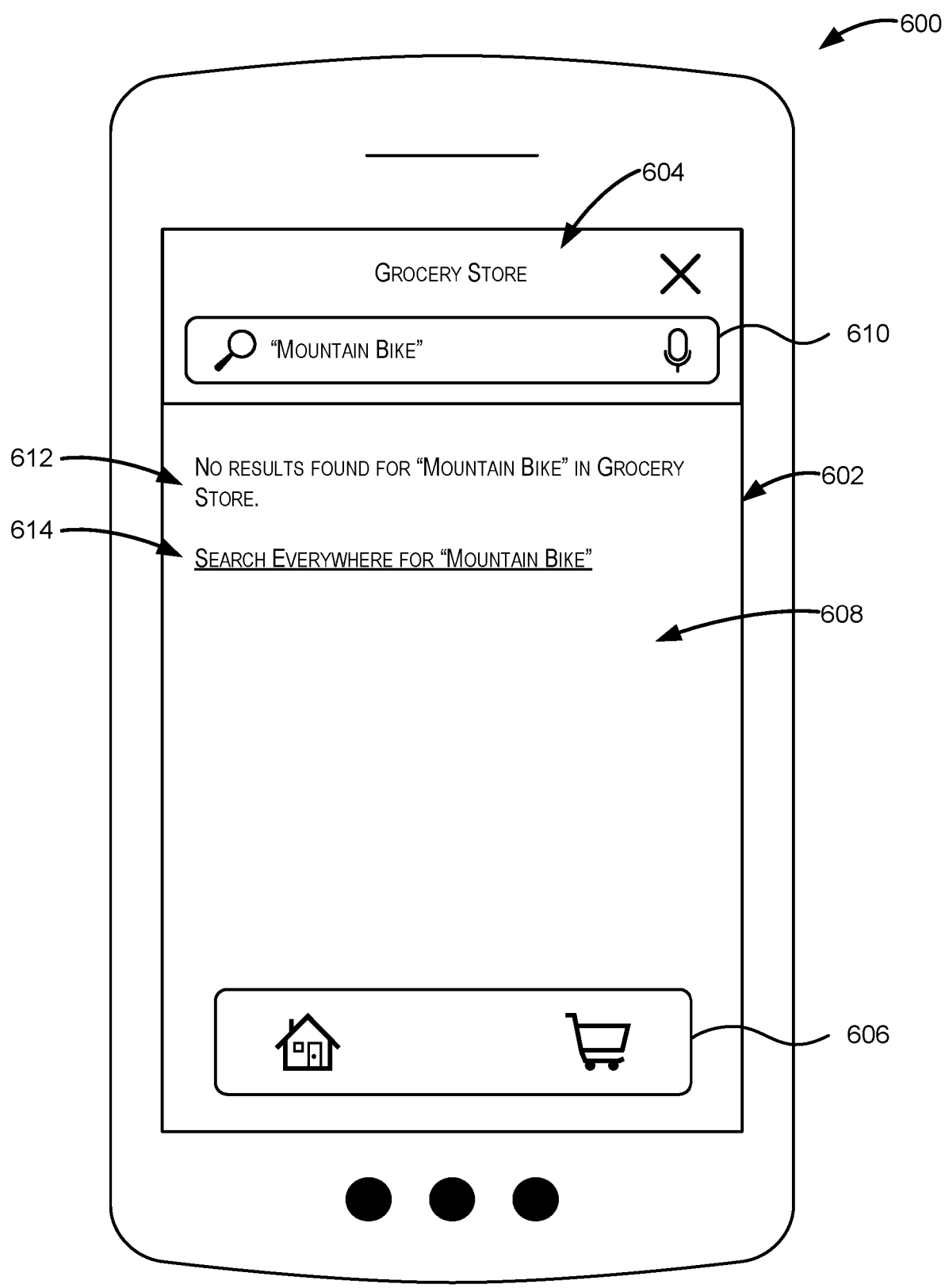
FIG. 6 is a diagram illustrating an example GUI depicting the results of a search that exceeds the scope of a specialty store, according to some embodiments.

FIG. 6 is a diagram illustrating an example GUI (e.g., GUI 602) depicting the results of a search that exceeds the scope of a specialty store, according to some embodiments. As described herein, the user device 600 can be similar to other user devices, including user devices 400 of FIGS. 4 and 500 of FIG. 5, while the subsequent GUI 602 may be similar to other specialty GUIs, secondary GUIs, or subsequent GUIs corresponding to a specialty store mode, including the subsequent GUI 502 of FIG. 5. As depicted in FIG. 6 as a continuing non-limiting example, the specialty store mode can correspond to the grocery store discussed above with respect to FIGS. 4 and 5.

The subsequent GUI 602 can include top navigation bar 604, bottom navigation bar 606, web content field 608, and search bar 610. These graphical elements may be similar to respective graphical elements found within subsequent GUI 502 of FIG. 5, including top navigation bar 504, bottom navigation bar 506, web content field 508, and search bar 510. As depicted in FIG. 6, search bar 610 is displaying a search query for "mountain bike." Because the store application is still in the specialty store mode corresponding to the grocery store, the search for "mountain bike" is outside the search scope defined for the grocery store in the corresponding graphical interface specification. As a result, the search results 612 displayed within web content field 608 indicate that no results were found corresponding to the query. In addition, an egress link 614 is displayed within the web content field 608. The egress link 614 can represent an option to leave the specialty store mode, return to the primary storefront and the primary GUI, and conduct the same search query again with the search scope of primary storefront (e.g., search against all items available within the store app). The egress link 614 can include a URL that corresponds to one of the egress identifiers, including egress URLs or egress rules, defined in the graphical interface specification for the specialty store.

Figure 7:
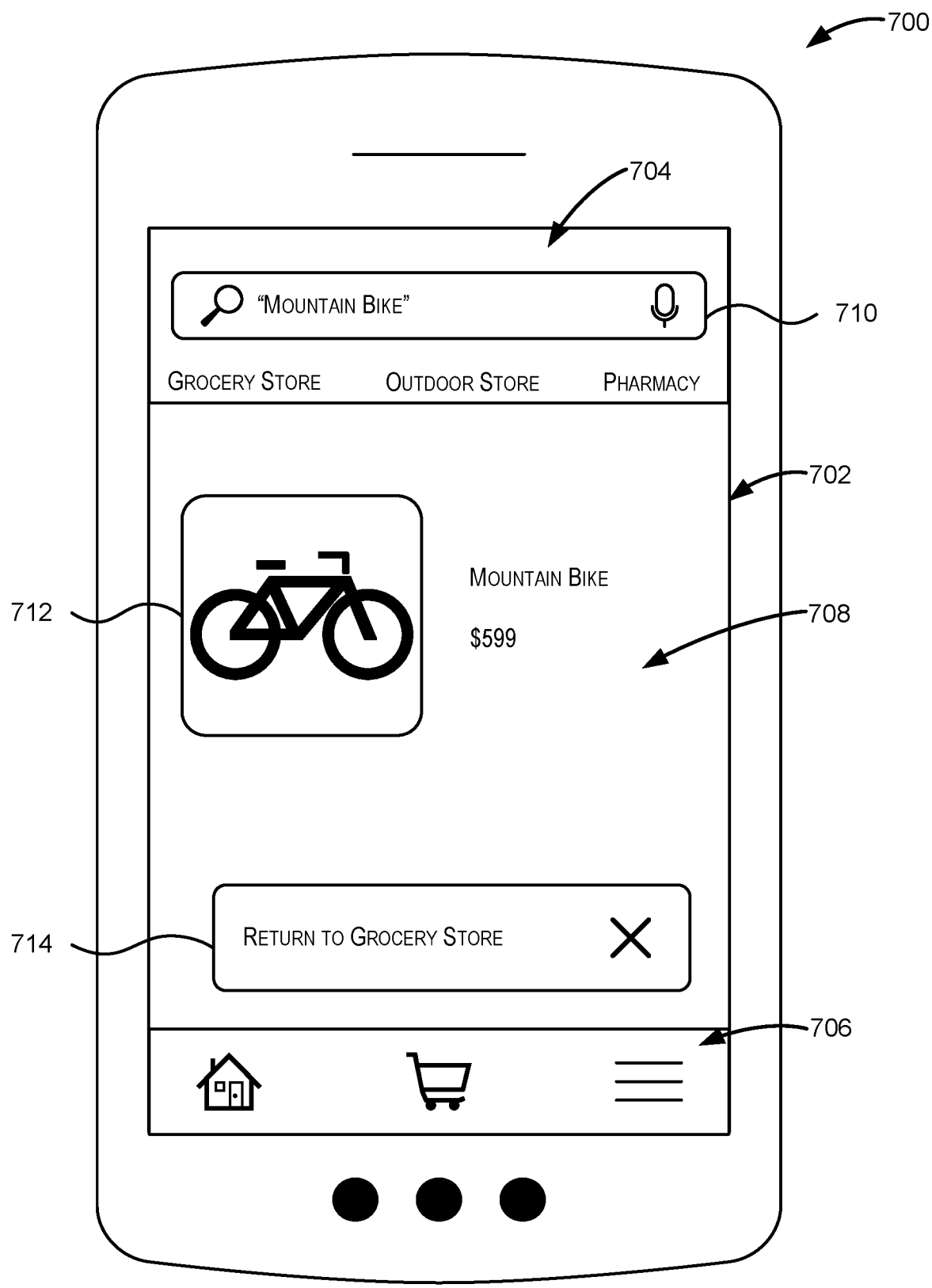
FIG. 7 is another diagram illustrating an example GUI corresponding to a primary store that is presented based on leaving the specialty store via an egress link, according to some embodiments.

FIG. 7 is another diagram illustrating an example GUI (e.g., GUI 702) corresponding to a primary store. The GUI 702 can be presented based at least in part on leaving the specialty store via a particular egress link, according to some embodiments. As described herein, the user device 700 can be similar to other user devices, including user devices 400, 500, 600 of FIGS. 4-6, while the GUI 702 may be similar to the GUI 402 of FIG. 4. As depicted in FIG. 7 in a continuing non-limiting example, the primary GUI can display the results of a search query that corresponds to a search query conducted within the specialty store mode that returned no results.

The GUI 702 can include top navigation bar 704, bottom navigation bar 706, web content field 708, and search bar 710, which can be similar to the corresponding elements described above with respect to FIG. 4. By way of example, the search bar 710 shows a search query for "mountain bike" that was the same failed query from specialty store of FIG. 6. However, now that the search has been conducted from within the primary storefront, with a larger search scope, the search results include a mountain bike 712 that corresponds to the query.

In some embodiments, upon egressing from a specialty store mode according to one or more rules defined in the specialty store mode's graphical interface specification, the GUI 702 may display an additional graphical element such as a re-ingress icon 714. The re-ingress icon 714 can correspond to a link to return to the specialty store mode in a state the specialty store mode was in prior to egressing. When the specialty store mode is egressed in this manner, specialty state data corresponding to the state of the specialty store mode and the subsequent GUI can be stored. Thus, interacting with the re-ingress icon 714 can reenter the specialty store mode and restore the subsequent GUI. For example, if a user were to tap on re-ingress icon 714, a mode control module of the store application can instruct a user interface module to transition the subsequent GUI from a background state to a visible state over the GUI 702, with the subsequent GUI restored to the state stored during egress.

The search query executed from within the primary storefront can be included in updated primary state data corresponding to the GUI 702 and the primary storefront. Similarly, the failed query from the specialty store discussed above with respect to FIG. 6 can be included in updated specialty state data corresponding to the subsequent GUI 602 and the specialty store mode. In some embodiments, the search history from within the primary storefront and the specialty store mode may be used to provide one or more suggested search queries from within the primary storefront and/or the specialty store mode. For example, since the query for "mountain bike" did not return results within the specialty store mode, but successfully returned results after egress to the primary storefront, the GUI 702 may present the user a suggested search query for additional searches related to the "mountain bike" query, or may present to the user the "mountain bike" query as a recent query to repeat within the primary storefront. If the user re-enters the specialty store mode (e.g., by interacting with re-ingress icon 714), the subsequent GUI may show suggested queries that do not include "mountain bike" or related queries, since those queries are outside the scope of the specialty store mode. As a further example, if the user conducts a search from GUI 702 within the primary storefront for "bananas" and then subsequently enters the specialty store mode, the subsequent GUI can present to the user suggested search queries related to "bananas."

Figure 8:
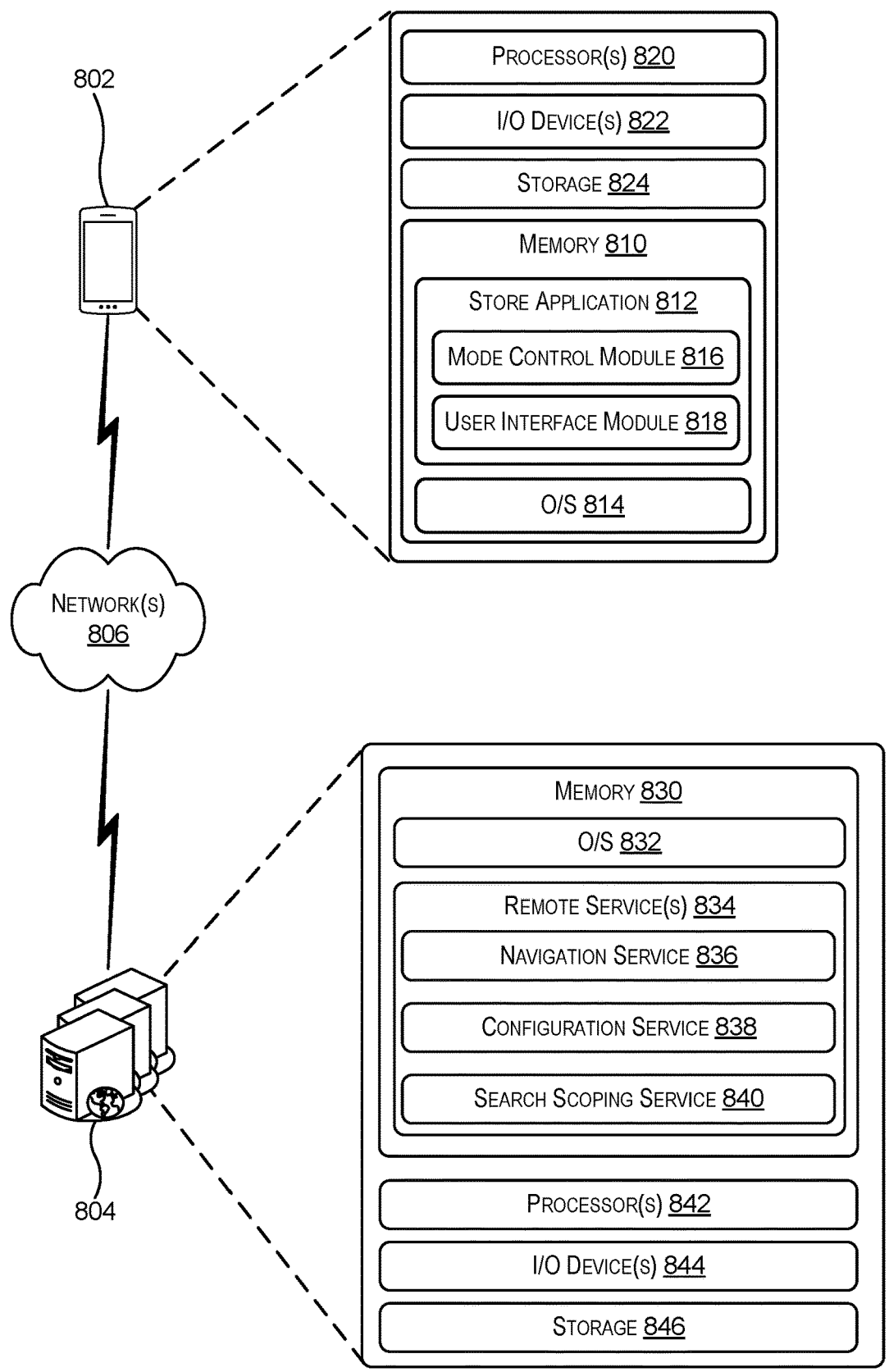
FIG. 8 is a simplified block diagram illustrating an example architecture of a system for generating the GUIs discussed herein, according to some embodiments.

FIG. 8 is a simplified block diagram illustrating an example architecture of a system for generating the GUIs discussed herein, according to some embodiments. The diagram includes a user device 802, a server device 804, and one or more network(s) 806. Each of these elements depicted in FIG. 8 may be similar to one or more elements depicted in other figures described herein. For example, the user device 802 may be similar to the user device 114 of FIG. 1 or other user devices. The server device 804 can be a remote device or one or more remote computing devices, including cloud devices, and may host one or more remote services including the remote service(s) 306 of FIG. 3. The network(s) 806 may include any one or a combination of many different types of networks, such as cable networks, the Internet, wireless networks, cellular networks, and other private and/or public networks.

As described herein, the user device 802 can have at least one memory 810, one or more processing units (or processor(s)) 820, and one or more input/output ("I/O") device(s) 822. The processor(s) 820 may be implemented as appropriate in hardware, computer-executable instructions, firmware or combinations thereof. Computer-executable instruction or firmware implementations of the processor(s) 820 may include computer-executable or machine executable instructions written in any suitable programming language to perform the various functions described. The I/O device(s) 822 can include displays, monitors, touch screens, mouse, keyboard, or other I/O device.

The memory 810 may store program instructions that are loadable and executable on the processor(s) 820, as well as data generated during the execution of these programs, including state information corresponding to the state of one or more GUIs generated by the programs. Depending on the configuration and type of user device 802, the memory 810 may be volatile (such as random access memory ("RAM")) or non-volatile (such as read-only memory ("ROM"), flash memory, etc.). In some implementations, the memory 810 may include multiple different types of memory, such as static random access memory ("SRAM"), dynamic random access memory ("DRAM") or ROM. The user device 802 may also include additional storage 824, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the storage 824 may be utilized to store data contents received from one or more other devices (e.g., server device 804). For example, the storage 824 may store cached or synchronized configuration data from a graphical interface specification.

The memory 810 may include an operating system (O/S) 814 and one or more application programs, modules, or services for implementing the features disclosed herein, including a store application 812 (e.g., an example of the application(s) discussed above in connection with FIGS. 1-7). The store application 812 may be configured to generate and present, in conjunction with the O/S 814 and other modules (e.g., a device interface module, etc.), a primary GUI corresponding to a primary store and a secondary GUI corresponding to a specialty store at one of the I/O device(s) 822 (e.g., a touchscreen display). The store application 812 may also be configured to send, receive, and/or store configuration data from the server device 804. The configuration data can be all or a portion of the graphical interface specification for a specialty store mode within the store application 812, and can be received from a remote service like the configuration service 838 described in more detail below. In some embodiments, the store application 812 can send configuration data corresponding to navigation routing, or send configuration data corresponding to a search scope for the specialty store mode. The configuration data can be sent to corresponding remote services including navigation service 836 or search scoping service 840 at the server device 804. Additionally, the store application 812 may be configured to receive, store, and/or display web content or web pages received from the server device 804.

The store application 812 can further include a mode control module 816 and a user interface module 818. These modules may be an example of the mode control module 302 and user interface module 304 described above with respect to FIG. 3. When the store application 812 first begins running on the user device 802, or at any suitable time, it can provide a primary GUI at the display of the user device 802. The primary GUI can correspond to the primary storefront of the store application.

In some embodiments, the mode control module 816 may be configured to receive a plurality of graphical interface specifications corresponding to specialty store modes within the store application 812. The graphical interface specifications can be received by the mode control module 816 when the store application 812 first executes at the user device 802, upon change, according to a predefined schedule and/or frequency, or at any suitable time. The received graphical interface specifications may be transmitted from the configuration service 838. The received graphical interface specifications may be cached at the user device 802, including cached in storage 824 or in memory 810. Subsequent executions of the store application 812 may allow the graphical interface specifications to be received from the local cache instead of received from the server device 804.

The mode control module 816 can be configured to process ingress/egress requests corresponding to navigating to one of the ingress/egress identifiers discussed above in connection with FIG. 2. When the store application 812 is first launched and the graphical interface specifications may be received at the user device 802, the mode control module 816 can transmit information to configure a routing service and a search scoping service (e.g., the navigation service 836 and the search scoping service 840, respectively). Configuring the navigation service 836 can include transmitting data corresponding to the ingress identifiers and egress identifiers for the specialty store modes. In this way, the navigation service 836 can respond to navigation requests from both within the store application and outside the store application (e.g., at a web browser application running on the user device 802) and direct those navigation requests to the mode control module 816. Similarly, configuring the search scoping service 840 can include transmitting data (e.g., a search scope reference or database alias) to the search scoping service 840 to identify which items within the store inventory database are searchable with queries from within each specialty store mode or the primary storefront of the store application 812.

In some embodiments, the mode control module 816 may be configured to generate the secondary GUI based on a navigation request received at the user device 802. The navigation request can be parsed at a navigation service (e.g., navigation service 836). In some embodiments, the navigation request can be handled by the store application 812 directly (e.g., egressing out of a specialty store mode). When the navigation request matches an ingress identifier of one of the specialty store modes available within the store application 812, the mode control module 816 can use the received graphical interface specification to generate the secondary GUI. Generating the secondary GUI can include configuring one or more graphical elements, including navigation bars (e.g., the top and bottom navigation bars), one or more navigational icons, or navigation text.

In some embodiments, the user interface module 818 may be configured to present the secondary GUI generated by the mode control module 816. Presenting the secondary GUI can include displaying, in conjunction with the O/S 814 and other modules running on the user device 802, the secondary GUI at the display of the user device 802. The user interface module 818 may also be configured to transition the primary GUI into a background state not visible at the display of the user device 802, transition the secondary GUI to a background state not visible at the display of the user device 802, dismiss the secondary GUI, and to animate the transitions between the two GUIs. In some embodiments, the mode control module 816 may also be configured to generate a re-ingress icon for display at the primary GUI. The re-ingress icon can be presented by the user interface module 818 in cases where the secondary GUI transitions to a background state not visible at the display of the user device instead of being dismissed entirely.

Turning now to server device 804 in more detail, the server device 804 can be any suitable type of computing device including, but not limited to, a laptop computer, a desktop computer, a mobile phone, a smartphone, a server computer, etc. In some embodiments, the server device 804 is executed by one or more virtual machines implemented within a cloud computing or other hosted environment. The cloud computing environment may include provisioned computing resources like computing, storage, and networking. The server device 804 can communicate with the user device 802 via the network(s) 806 or other network connections. The server device 804 may be configured to implement the functionality described herein as part of a distributed computing environment.

The server device 804 can include a memory 830, one or more processor(s) 842, I/O devices 844, and at least one storage unit 846. As with the processor(s) 820 of user device 802, the processor(s) 842 may be implemented as appropriate in hardware, computer-executable instructions, software, firmware, or combinations thereof. Computer-executable instruction, software, or firmware implementations of the processor(s) 842 may include computer-executable or machine-executable instructions written in any suitable programming language to perform the various functions described. The memory 830 may store program instructions that are loadable and executable on the processor(s) 842, as well as data generated during the execution of these programs. Depending on the configuration and type of memory included in the server device 804, the memory 830 may be volatile (such as RAM) and/or non-volatile (such as read-only memory ("ROM"), flash memory, or other memory). In some embodiments, the storage 846 may include one or more databases, data structures, data stores, or the like for storing and/or retaining information associated with the server device 804 or the user device 802. The storage 846 may include a data store for storing graphical interface specifications, associated graphical assets, and/or a store item inventory.

The memory 830 may include an operating system (O/S) 832 and one or more application programs, modules, or services for implementing the features disclosed herein, including remote service(s) 834. The remote service(s) 834 can be configured to transmit and receive data with the user device 802 over the network(s) 806. The remote service(s) 834 can include a navigation service 836, a configuration service 838, and a search scoping service 840. In some embodiments, one or more operations or functions described herein with respect to the remote service(s) 834 may be performed at the user device 802, for example as headless services running concurrently with the store application 812.

As described above, in some embodiments, the navigation service 836 can be configured with routing information corresponding to the ingress and egress identifiers contained within the graphical interface specifications for each specialty store within the store application 812. The navigation service 836 can then provide routing services for navigation requests received from within the store application 812 or from another application (e.g., a web browser application).

In some embodiments, the configuration service 838 can transmit graphical interface specifications or other configuration data to the user device 802 when the store application 812 first runs. The transmitted graphical interface specifications may be retrieved from storage 846 or other data store accessible to the configuration service 838.

In some embodiments, the search scoping service 840 may receive search scope configuration data from the mode control module 816 based on the graphical interface specifications obtained by the mode control module 816. Configuring the search scope at the search scoping service 840 may include associating a set of inventory items (e.g., a scope) with search queries executed within a specialty store mode.

Figure 9:
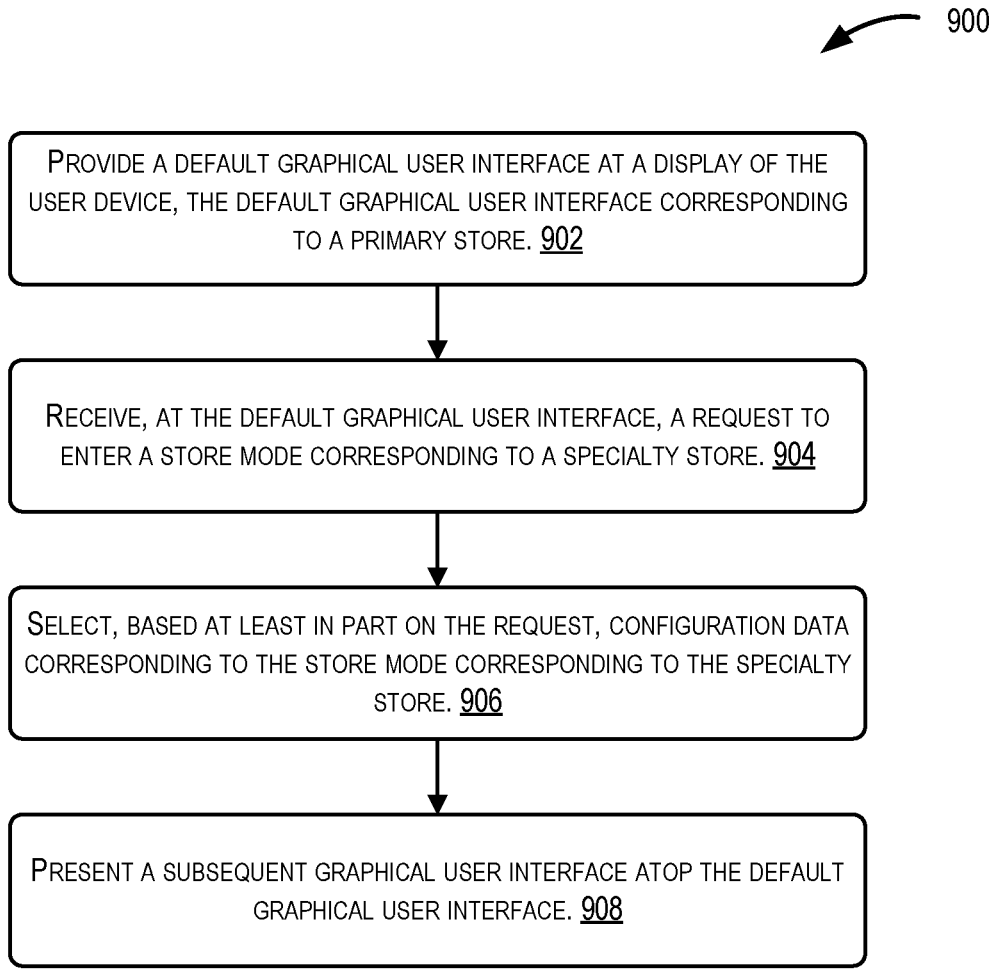
FIG. 9 is a simplified flow diagram of an example process for generating a primary and secondary GUI, according to some embodiments.

FIG. 9 is a simplified flow diagram of an example process 900 for generating a primary and secondary GUI, according to some embodiments. The process 900 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Some, any, or all of the process 900 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The process 900 may be performed by one or more computing devices, including the user devices 114 of FIG. 1 or 802 of FIG. 8 and/or the server device 804 of FIG. 8.

The process 900 can begin at block 902, when a default GUI is provided at a display of a user device. The default GUI can correspond to a primary store such as an online retail store offering goods, groceries, pharmaceuticals, designer clothing, or other items for purchase via a store application (e.g., store application 812 of FIG. 8) executing at the user device. In some embodiments, the default GUI can be a primary GUI (e.g., GUI 402 of FIG. 4) and may be the initial GUI presented at the display of the user device when the store application is first executed.

At block 904, a request to enter a store mode can be received at the default GUI. The store mode can correspond to a specialty store within the store application. The specialty store can offer a subset of items of the retail store that correspond to one or more categories. For example, a grocery store can offer items typically associated with grocery stores (e.g., food, produce, etc.). The specialty store may be one of a plurality of specialty stores associated with the retail store accessed via the store application.

The request to enter the store mode can result from an interaction with a link or other navigational button at the default GUI. In some embodiments, the request can include an ingress identifier (e.g., a URI or URL) corresponding to a web page or other web content that can be served at the user device to complete the navigation to the new page or content. Determining whether to enter the store mode based on the request can include matching all or part of the ingress identifier of the request to ingress identifiers or ingress rules contained within configuration data corresponding to the store mode.

At block 906, configuration data (e.g., a graphical interface specification such as the graphical interface specification 200 of FIG. 2) corresponding to the store mode can be selected by, for example, a mode control module of the store application (e.g., the mode control module 302 and/or 816 of FIGS. 3 and 8, respectively). In some embodiments, the configuration data can specify one or more attributes corresponding to at least one graphical interface element to be utilized within a subsequent graphical user interface (e.g., a specialty GUI such as the GUI 502 of FIG. 5). The subsequent GUI may be different from the default GUI in at least one visual aspect (e.g., a color scheme, a graphical asset, etc.).

In some embodiments, the configuration data is included in a graphical interface specification (e.g., the graphical interface specification 200 of FIG. 2). The configuration data may specify one or more attributes corresponding to one or more graphical interface elements to be utilized within the subsequent GUI. The graphical interface specification can be a file, data object, or data structure containing a set of predefined fields, for example, a JSON file or other suitable file, containing configuration data. In some embodiments, the configuration data can include one or more ingress identifiers, one or more egress identifiers, a store front page identifier, a store cart identifier, a search scope indicator, navigation text, and one or more graphical assets. The user device can receive all or a portion of the values corresponding to the fields within the graphical interface specification from a server device, service provider, or remote service associated with the specialty store.

In some embodiments, the search scope indicator can identify a scope that defines a set of items offered by the specialty store. The set of items can be different from the items available within the primary store, for example, a subset of items available. Because the searches within the store mode are scoped, a search query received at the subsequent GUI may only target the set of items for the specialty store.

At block 908, the subsequent GUI can be presented at the display of the user device. In some embodiments, the subsequent GUI can be presented atop the default GUI. The subsequent GUI may partially, or entirely, obstruct the user's view of the default GUI. The subsequent GUI can be configured based on configuration data, for example, configuration data contained within the graphical interface specification corresponding to the store mode.

In some embodiments, the user device can maintain state data associated with the store application. The state data can be primary state data and/or specialty state data (e.g., data corresponding to any suitable number of specialty stores). The primary state data can correspond to the primary store. The specialty state data can correspond to the specialty store(s). The state data can include navigation history corresponding to one or more network pages visited while in the primary store or specialty store(s) and/or one or more store items added to a shopping cart corresponding to the primary store or one or more items added to a store shopping cart corresponding to the specialty store(s). In some embodiments, changes to the primary state data can be reflected in changes to the specialty state data. For example, specialty state data (e.g. data associated with a specialty store shopping cart) can be updated based upon updating the primary state data (e.g., adding a specialty store item to a shopping cart from within the primary store).

The state data can additionally include a search history corresponding to one or more search queries executed from within the primary store or the secondary store(s). In some embodiments, the state data can be labeled according to the corresponding applicability. For example, search queries initiated from within the primary store may be labeled with an identifier corresponding to the primary store while search queries initiated within a respective secondary store can be labeled with an identifier corresponding to that secondary store. The search history may be used to provide suggested search queries at the search bar or recent search results at the web content field within the default GUI, the subsequent GUI, or any suitable GUI of the application (e.g., a GUI corresponding to another specialty store). According to certain embodiments, the subsequent GUI may present data corresponding to at least a portion of the search history of the primary state data. The data can include one or more of the suggested search queries based upon the search history from the primary store.

In some embodiments, while in the store mode, a user interaction at the subsequent GUI can result in an egress indication. The egress indication can be a navigation request to leave the store mode and return to the primary store and the corresponding default GUI. In response to receiving the egress indication, the mode control module and the user interface module can dismiss the subsequent GUI from the display of the user device and present the default GUI at the display of the user device. In some embodiments, the user interface module of the store application can provide animations for the transition from the subsequent GUI to the default GUI. These operations may be similar to those described for the mode control module 302 and/or mode control module 816 and the user interface module 304 and/or user interface module 818 of FIGS. 3 and 8, respectively.

According to certain embodiments, the subsequent GUI can be presented based upon the state data stored. For example, a user may search at the default GUI for an item corresponding to the specialty store. The user may add the item to the specialty store shopping cart without navigating to the specialty store or having the store application enter the specialty store mode. Upon entering the specialty store mode, the subsequent GUI can include a specialty shopping cart icon corresponding to specialty state data that was updated based upon the user adding items to the specialty store shopping cart while in the primary storefront. The updated specialty shopping cart icon can indicate the total number of items present in the specialty store shopping cart.

While in the store mode, the user can, in some embodiments, enter a search query at the subsequent GUI. The query may be directed to one or more items outside the search scope of the store mode, resulting in an empty set of search results returned to the user at the subsequent GUI. In response to obtaining the empty set of search results, the subsequent GUI can present to the user an option to execute the search query again from within the primary store. If the user selects the presented option, the store application can transition from the subsequent GUI to the default GUI and run the search query again. In addition, the default GUI can also include a return option (e.g., a re-ingress option or icon) for returning to the store mode. The return option can be based upon specialty state data stored for the store mode, such that if the return option is selected, the subsequent GUI can be restored with the same state (e.g., navigational history, current page, etc.) it had prior to exiting the store mode, in accordance with the specialty state data.

Figure 10:
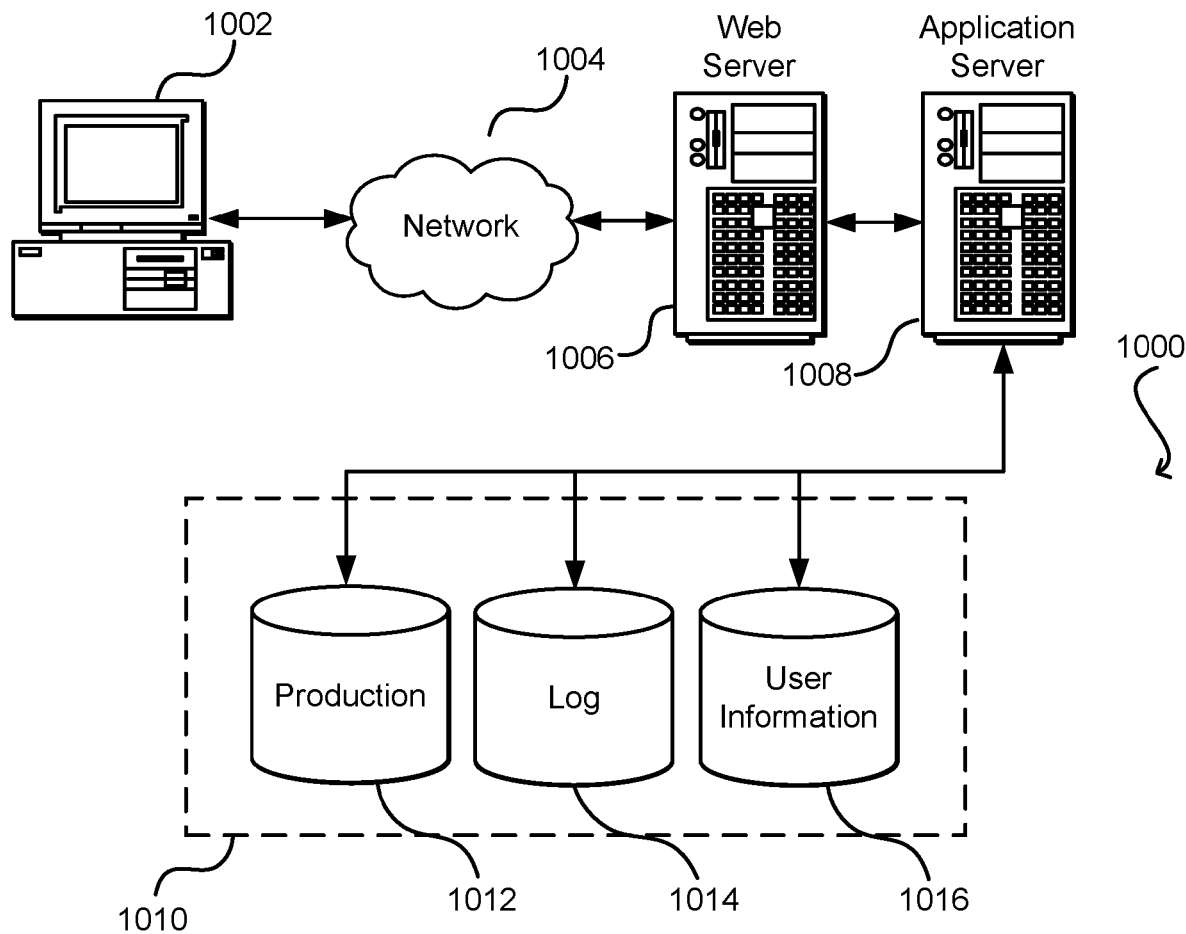
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the environment 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, SAP®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   presenting, at a user device, a primary graphical user interface (GUI) corresponding to a primary storefront;
   receiving, at the primary GUI, a request to enter a secondary storefront, the request including a uniform resource locator (URL) associated with the secondary storefront;
   selecting a graphical interface specification from a plurality of graphical interface specifications, the graphical interface specification including interface configuration information associated with the secondary storefront, the graphical interface specification being selected based at least in part on the URL included in the request;
   generating a specialty GUI for the secondary storefront, the specialty GUI comprising one or more graphical elements that are generated in accordance with the interface configuration information associated with the secondary storefront; and
   presenting the specialty GUI over the primary GUI corresponding to the primary storefront;
   in response to presenting the specialty GUI corresponding to the secondary storefront, transitioning the primary GUI corresponding to the primary storefront to a background state, the primary GUI corresponding to the primary storefront being hidden from display while in the background state;
   generating updated primary state data based on activity within the secondary storefront;
   receiving, while in the secondary storefront, an egress request to exit the secondary storefront and return to the primary storefront; and
   responsive to receiving the egress request, transitioning the primary GUI from the background state, the primary GUI comprising a primary store graphical element presented based at least in part on the updated primary state data.

2. The computer-implemented method of claim 1, wherein the interface configuration information associated with the secondary storefront includes an ingress identifier, and wherein selecting the interface configuration information includes matching the URL received in the request to a portion of the interface configuration information associated with the secondary storefront.

3. The computer-implemented method of claim 2, further comprising:
   receiving an egress instruction associated with a subsequent user interaction at the specialty GUI;
   transitioning the primary GUI from the background state to a foreground state, the primary storefront being visible at the display while in the foreground state; and
   transitioning the specialty GUI to the background state, the specialty GUI being hidden from the display while in the background state.

4. The computer-implemented method of claim 2, wherein the interface configuration information further comprises a store front page identifier, a search scope, search scope display text, navigation text, one or more graphical assets, and a store cart identifier.

5. A user device, comprising:
   one or more processors; and
   one or more memories storing computer-executable instructions that, when executed with the one or more processors, cause the user device to:
      provide a default graphical user interface at a display of the user device, the default graphical user interface corresponding to a primary store;
      receive an indication that an item was viewed or that the item was selected for purchase;
      generate updated state data associated with a store mode based on the indication;
      receive, at the default graphical user interface, a request to enter the store mode corresponding to a specialty store, the request comprising a uniform resource locator (URL) associated with the specialty store;
      select, based at least in part on the URL of the request, configuration data corresponding to the store mode corresponding to the specialty store; and
      present, at the display of the user device, a subsequent graphical user interface different from and atop of the default graphical user interface, the subsequent graphical user interface being configured based at least in part on the configuration data selected and comprising a graphical element corresponding to the updated state data.

6. The user device of claim 5, wherein the configuration data specifies one or more attributes corresponding to at least one graphical interface element to be utilized within the subsequent graphical user interface.

7. The user device of claim 6, wherein the configuration data comprises at least one of: one or more ingress identifiers, one or more egress identifiers, a store front page identifier, a store cart identifier, a search scope indicator, navigation text, and one or more graphical assets.

8. The user device of claim 5, wherein the URL corresponds to an ingress identifier, wherein the configuration data comprises one or more ingress rules, and wherein the configuration data is selected based at least in part on matching the ingress identifier to the one or more ingress rules of the configuration data.

9. The user device of claim 5, wherein executing the computer-executable instructions further causes the user device to:
receive an egress indication associated with a user interaction at the subsequent graphical user interface;
in response to receiving the egress indication, dismiss the subsequent graphical user interface from the display of the user device; and
present the default graphical user interface at the display of the user device.

10. The user device of claim 9, wherein executing the computer-executable instructions further causes the user device to maintain state data associated with the store mode, the state data comprising at least one of: navigation history corresponding to one or more network pages visited while in the store mode and one or more store items added to a shopping cart while in the store mode.

11. The user device of claim 10, wherein the configuration data comprises a set of predefined fields, and wherein executing the computer-executable instructions further causes the user device to receive one or more values corresponding to one or more fields of the set of predefined fields, the one or more values being received from a service provider associated with the specialty store.

12. The user device of claim 5, wherein executing the computer-executable instructions further causes the user device to:
receive a search query at the subsequent graphical user interface of the specialty store;
obtain an empty set of search results based at least in part on executing the search query against a first set of items offered by the specialty store;
in response to obtaining the empty set of search results, present an option to execute the search query against a second set of items offered by the primary store; and
in response to receiving an indication that the option was selected, present the default graphical user interface and a return option for returning to the store mode, wherein the return option is associated with state data corresponding to the store mode, and wherein selection of the return option causes a return to the store mode, the return being in accordance with the state data.

13. The user device of claim 5, wherein executing the computer-executable instructions further causes the user device to identify that the request is one to enter the store mode based at least in part on matching the URL to a portion of the configuration data.

14. One or more non-transitory computer-readable media including instructions that, when executed by a processor of a computing device, cause the computing device to:
provide, at a display of the computing device, a primary graphical user interface corresponding to a primary store;
receive a request to enter a store mode associated with a specialty store, the request comprising a uniform resource locator (URL) associated with the specialty store;
in response to receiving the request:
store primary state data associated with the primary store; and
select, based at least in part on the URL of the request, an interface configuration from a plurality of interface configurations, the interface configuration corresponding to the store mode;
present, at the display of the computing device, a secondary graphical user interface different from the primary graphical user interface, the secondary graphical user interface being presented over the primary graphical user interface and based at least in part on the interface configuration selected;
generate updated primary state data based on activity within the specialty store;
receive, while in the store mode, an egress request to exit the store mode and return to the primary store; and
responsive to receiving the egress request, transition from presenting the secondary graphical user interface to the primary graphical user interface, the primary graphical user interface being presented based at least in part on the updated primary state data and comprising a re-ingress option for returning to the specialty store.

15. The one or more non-transitory computer-readable media of claim 14, wherein the instructions comprise further instructions that, when executed, cause the processor to:
receive, while in the store mode, a subsequent request to enter a new store mode associated with a new specialty store;
in response to receiving the subsequent request, select a new interface configuration corresponding to the new store mode; and
present, at the display of the computing device, a new graphical user interface based at least in part on the new interface configuration selected.

16. The one or more non-transitory computer-readable media of claim 14, wherein the instructions comprise further instructions that, when executed, cause the processor to:
in response to receiving the egress request, store specialty state data corresponding to the activity within the specialty store;
receive a further indication that the re-ingress option was selected; and
in response to the further indication, transition from presenting the primary graphical user interface to the secondary graphical user interface, the secondary graphical user interface being presented based at least in part on the specialty state data.

17. The one or more non-transitory computer-readable media of claim 14, further comprising additional instructions that, when executed, cause the processor to:
receive, prior to entering the store mode, an indication that an item was viewed or that the item was selected for purchase; and
in response to entering the store mode, generate updated specialty state data based on the primary state data.

18. The one or more non-transitory computer-readable media of claim 17, wherein the specialty state data corresponds to a specialty store shopping cart, wherein the primary state data corresponds to a primary store shopping cart, and wherein presenting the secondary graphical user interface further comprises displaying an updated specialty shopping cart icon corresponding to the updated specialty state data.

19. The one or more non-transitory computer-readable media of claim 14, wherein the primary state data comprises a search history corresponding to the primary store, and wherein presenting the secondary graphical user interface comprises displaying data corresponding to at least a portion of the search history of the primary state data.

20. The one or more non-transitory computer-readable media of claim 14, wherein the interface configuration comprises a search scope that defines a set of items offered by the specialty store, the set of items different from a primary set of items offered by the primary store, and wherein a search query received at the secondary graphical user interface targets the set of items.

* * * * *